(12) United States Patent
Moebius

(10) Patent No.: US 9,592,720 B2
(45) Date of Patent: Mar. 14, 2017

(54) VEHICLE DOOR

(71) Applicant: Brose Fahrzeugteile GmbH & Co. Kommanditgesellschaft, Hallstadt, Hallstadt (DE)

(72) Inventor: Michael Moebius, Seelitz (DE)

(73) Assignee: Brose Fahrzeugteile GmbH & Co. Kommanditgesellschaft, Hallstadt, Hallstadt (DE)

( * ) Notice: Subject to any disclaimer, the term of this patent is extended or adjusted under 35 U.S.C. 154(b) by 0 days.

(21) Appl. No.: 14/428,612

(22) PCT Filed: Aug. 23, 2013

(86) PCT No.: PCT/EP2013/067557
§ 371 (c)(1),
(2) Date: Mar. 16, 2015

(87) PCT Pub. No.: WO2014/040842
PCT Pub. Date: Mar. 20, 2014

(65) Prior Publication Data
US 2015/0239326 A1     Aug. 27, 2015

(30) Foreign Application Priority Data

Sep. 17, 2012   (DE) .................... 20 2012 103 532 U

(51) Int. Cl.
*B60J 5/04*    (2006.01)
*B60R 25/01*   (2013.01)

(52) U.S. Cl.
CPC .......... *B60J 5/0416* (2013.01); *B60J 5/0418* (2013.01); *B60J 5/0468* (2013.01); *B60J 10/30* (2016.02); *B60J 10/84* (2016.02); *B60R 25/01* (2013.01)

(58) Field of Classification Search
CPC ...... B60J 5/0418; B60J 5/0468; B60J 5/0416; B60J 10/84
See application file for complete search history.

(56) References Cited

U.S. PATENT DOCUMENTS 5,902,004 A * 5/1999 Waltz .................... B60J 5/0416
296/146.9
6,000,959 A * 12/1999 Curtindale .......... B60R 16/0207
439/246

(Continued)

FOREIGN PATENT DOCUMENTS

DE   WO 9912757 A1 *   3/1999   ............ B60J 5/0416
DE     EP 1088692 A2 *   4/2001   ............ B60J 5/0405

(Continued)

OTHER PUBLICATIONS

English translation of the International Preliminary Report on Patentability and Written Opinion for International Application No. PCT/EP2013/067557, dated Mar. 17, 2015, 7 pages.

(Continued)

*Primary Examiner* — Katherine Mitchell
*Assistant Examiner* — Marcus Menezes
(74) *Attorney, Agent, or Firm* — Lewis Roca Rothgerber Christie LLP

(57) ABSTRACT

A vehicle door is provided. The vehicle door comprises a door body which forms a cavity between a door outer panel and a door inner panel with an installation opening, an installation cover closing the installation opening with a lead-through opening for leading through connecting lines from the wet space side to the dry space side of the vehicle door, a multifunctional support for connecting functional elements of the vehicle door to the door body, a covering element connected with the multifunctional support for covering the lead-through opening in the installation cover, a first seal circumferentially extending along the edge of the (Continued)

installation cover, a second seal circumferentially extending along the lead-through opening of the installation cover, clip hooks protruding from the side of the covering element facing the dry space and positionally fixed sealing elements for accommodating the connecting lines.

9 Claims, 5 Drawing Sheets

(56) References Cited

U.S. PATENT DOCUMENTS

| | | | | |
|---|---|---|---|---|
| 6,767,049 | B1* | 7/2004 | Morrison | B60J 5/0418 296/1.08 |
| 6,823,628 | B2* | 11/2004 | Morrison | B60J 5/0416 49/348 |
| 6,991,278 | B2* | 1/2006 | Hockenberry | B32B 7/04 296/146.7 |
| 7,100,330 | B2* | 9/2006 | Reul | B60J 5/0418 296/146.7 |
| 2002/0005015 | A1* | 1/2002 | Spurr | B60J 5/0416 49/502 |
| 2002/0007598 | A1* | 1/2002 | Nishikawa | B60J 5/0416 49/502 |
| 2005/0235574 | A1* | 10/2005 | Gomez Camara | B60J 5/0416 49/502 |
| 2006/0265963 | A1* | 11/2006 | Winborn | B60J 5/0418 49/502 |
| 2008/0021619 | A1* | 1/2008 | Steegmann | E05B 81/78 701/49 |
| 2009/0044456 | A1* | 2/2009 | Syed | B60J 5/0416 49/460 |
| 2013/0169002 | A1* | 7/2013 | Mobius | B60J 5/0416 296/187.12 |

FOREIGN PATENT DOCUMENTS

| | | | |
|---|---|---|---|
| DE | 10 2008 035 534 A1 | 3/2009 | |
| DE | 102007063615 | * 5/2015 | B60J 5/0418 |
| EP | 1 088 692 A2 | 4/2001 | |
| WO | WO 2011/151173 A1 | 12/2011 | |

OTHER PUBLICATIONS

International Search Report corresponding to PCT/EP2013/067557, dated Nov. 26, 2013, 6 pages.

* cited by examiner

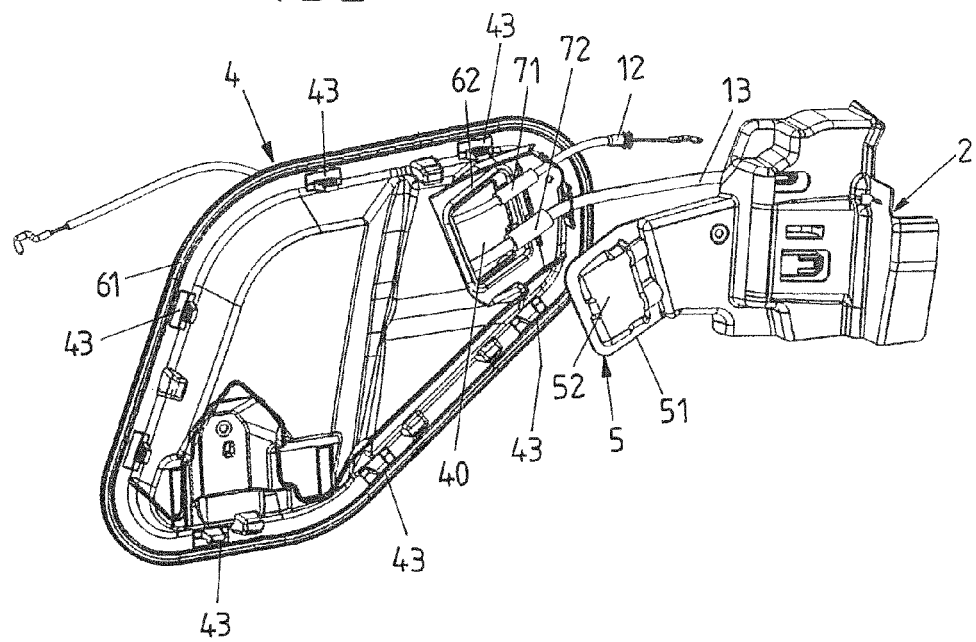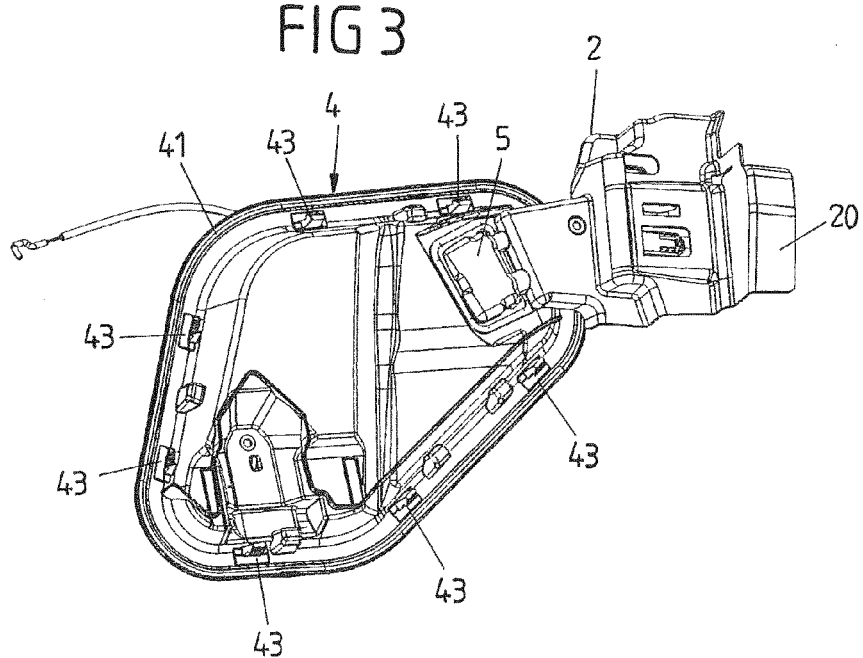

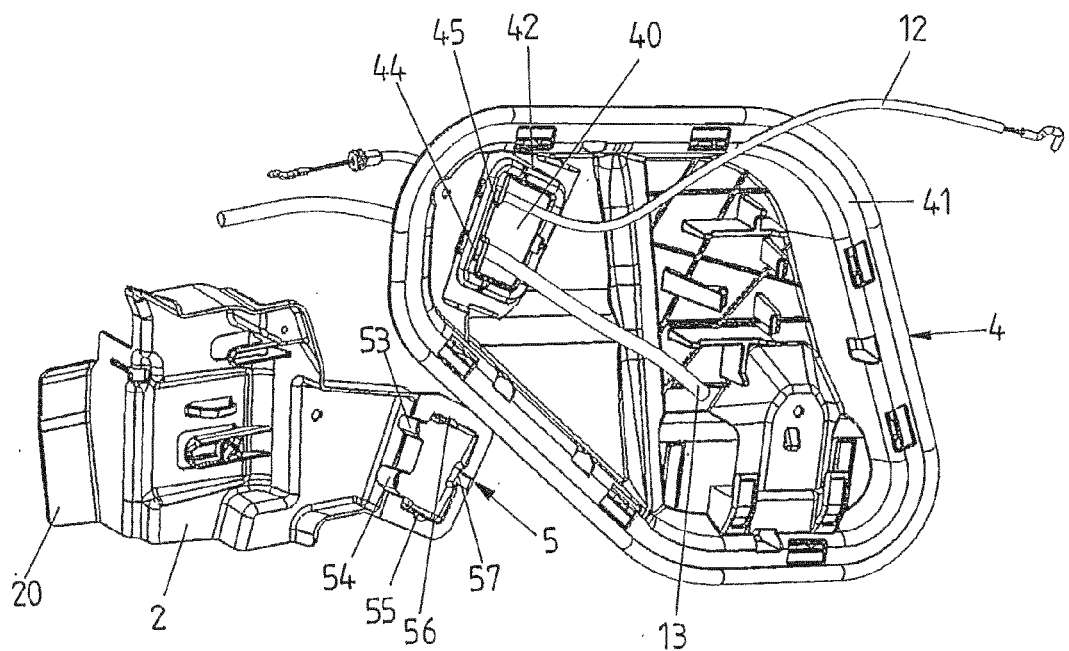
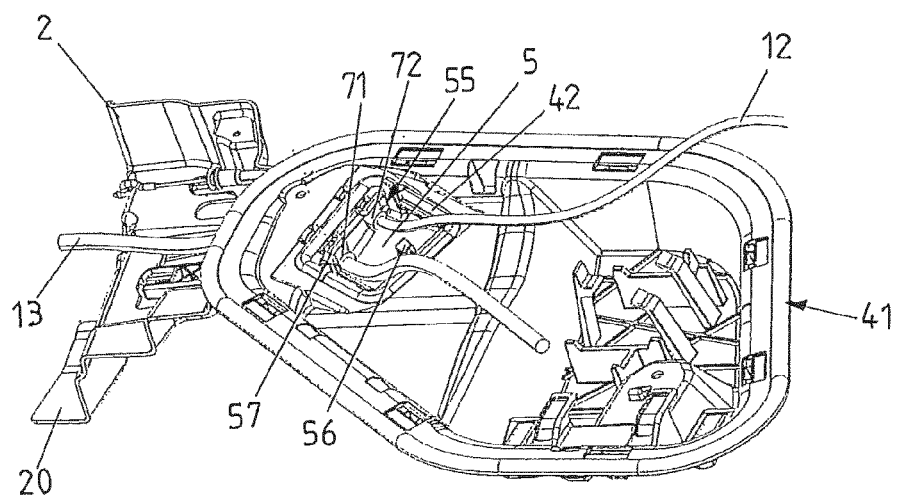

VEHICLE DOOR

CROSS-REFERENCE TO A RELATED APPLICATION

This application is a National Phase Patent Application of International Patent Application Number PCT/EP2013/067557, filed on Aug. 23, 2013, which claims priority of German Utility Model Application Number 20 2012 103 532.4, filed on Sep. 17, 2012.

BACKGROUND

This invention relates to a vehicle door with a door body and a multifunctional support arranged in the door body.

The door body of a vehicle door consists of a door outer panel forming the door outer skin of the vehicle door and a door inner panel connected with the door outer panel, between which a cavity is formed in which functional elements of the vehicle door such as for example a window lifter, a door lock, an actuating means for the door lock as well as a bearing bracket for an outside door handle of the vehicle door are arranged. The door lock, the actuating means for the door lock and the bearing bracket for the outside door handle of the vehicle door are premounted on a multifunctional support, which like further functional elements of the vehicle door are introduced through an installation opening arranged in the door inner panel into the cavity between door inner panel and door outer panel and are brought into their functional positions.

Since moisture can penetrate into the cavity between door outer panel and door inner panel for example via the door sill slot for leading through a window pane, which closes a window opening of the vehicle door, the installation opening is closed by an installation cover in a moisture-tight way, so that the wet space side of the door inner panel facing the cavity between the door outer panel and the door inner panel is separated from the dry space side of the door inner panel facing the vehicle interior space, which is covered by an interior door trim.

For the electrical and mechanical connection of the door lock with a central locking system and an interior door lock as well as for the electrical and mechanical connection of a drive for a door closing aid with a voltage source or a control means it is required to guide electrical and mechanical connecting lines such as actuating Bowdens and electric cables from the wet space side to the dry space side of the door inner panel. For this purpose, the installation cover includes a lead-through opening through which the connecting lines are guided. For the moisture-tight separation of the wet space side from the dry space side of the door inner panel, this lead-through opening however must be closed in a moisture-tight way just like the lead-through of the connecting lines.

As it is required in addition to protect the actuating bowdens, linkages or electric cables provided for actuating the door lock against external interventions, in particular against attempted burglaries, the multifunctional support includes a cover which is arranged such that burglary tools introduced into the door body or moisture penetrating into the door body are blocked or dissipated.

SUMMARY

It is an object of the present invention to secure the installation opening of the door inner panel and the opening of the installation cover as well as the lead-through of the connecting lines from the wet space side to the dry space side of the door inner panel against external influences and interventions with little manufacturing and installation effort.

The solution according to the invention provides a vehicle door comprising
- a door body which forms a cavity between a door outer panel and a door inner panel with an installation opening,
- an installation cover closing the installation opening with a lead-through opening for leading through connecting lines from the wet space side to the dry space side of the vehicle door,
- a multifunctional support for connecting functional elements of the vehicle door to the door body,
- a covering element connected with the multifunctional support for covering the lead-through opening in the installation cover,
- a first seal circumferentially extending along the edge of the installation cover,
- a second seal circumferentially extending along the lead-through opening of the installation cover,
- clip hooks protruding from the side of the covering element facing the dry space, which on closing of the opening of the installation cover lock into place with clip receptacles of the installation cover, and
- positionally fixed sealing elements for accommodating the connecting lines, which are arranged in the transition region between the covering element and the multifunctional support, which secure the installation opening in the door inner panel as well as the lead-through opening in the installation cover and the lead-through of the connecting lines from the wet space side to the dry space side of the door inner panel or the motor vehicle door against external influences and interventions with little manufacturing and installation effort.

The arrangement both of the first seal between the installation cover and the installation opening and of the second seal between the covering element connected with the multifunctional support and the lead-through opening of the installation cover on the installation cover provides for mounting both seals on the installation cover in one process step, so that a separate arrangement and mounting of a seal between the covering element and the installation cover can be omitted. In addition, a screw connection of the covering element with the installation cover, which increases the installation effort, can be omitted by arranging clip hooks on the side of the covering element facing the dry space, which in the mounted condition are locked into place with clip receptacles of the installation cover.

Due to the arrangement of the positionally fixed sealing elements in the transition region between the covering element and the multifunctional support for accommodating the connecting lines a complicated Bowden and cable fixation which likewise increases the installation effort is not required, wherein the covering element not only closes the lead-through opening in the installation cover, but also forms a secure anti-theft protection cover.

Preferably, the circumferential first and second seals are arranged in depressions which extend along the edge and the lead-through opening of the installation cover. The in particular semi-cylindrical depressions serve for accommodating cylindrical foam beads which form the first and second seals.

The positional fixation of the sealing elements preferably is effected in shell-shaped or semi-cylindrical receptacles of the installation cover, which correspond with shell-shaped or semi-cylindrical recesses in the structure of the covering element, so that in the mounted condition a cylindrical passage is created for accommodating the sealing elements which preferably consist of hollow cylindrically foamed sleeves for accommodating the connecting lines. Due to a slightly larger outside diameter of the sealing elements as compared to the cylindrical inside diameter of the shell-shaped or semi-cylindrical receptacles of the installation cover and the corresponding recesses of the covering element, the sealing elements are slightly compressed and form a moisture-tight abutment both against the jackets of the connecting lines and against the receptacles of the installation cover or the recesses of the covering element.

For securely closing the installation opening through the installation cover with little installation effort, the installation cover includes clip hooks protruding from the edge region of the installation cover on its surface facing the dry space side, which clip hooks lock into place with corresponding clip receptacles at the edge of the installation opening.

To facilitate clipping of the covering element with the installation cover, the covering element can be provided with a mounting handle formed as handle lever or recessed grip.

Only for additionally securing the covering element, can there be provided a securing element formed as screw connection, which connects the covering element with the installation cover or the door inner panel.

BRIEF DESCRIPTION OF THE DRAWINGS

With reference to an exemplary embodiment illustrated in the drawing the idea underlying the invention will be explained in detail.

FIG. 2 shows a perspective representation of an installation cover and multifunctional support with a covering element before covering the lead-through opening of the installation cover for leading through connecting lines as seen from the wet space side.

FIG. 3 shows a perspective representation of the installation cover for covering the installation opening and the covering element closing the lead-through opening in the installation cover as well as a part of the multifunctional support as seen from the wet space side.

FIG. 4 shows a perspective representation of an installation cover and multifunctional support with a covering element before covering the lead-through opening of the installation cover for leading through connecting lines as seen from the dry space side.

FIG. 5 shows a perspective representation of the installation cover for covering the installation opening and the covering element closing the lead-through opening in the installation cover as well as a part of the multifunctional support as seen from the dry space side.

DETAILED DESCRIPTION

Figure 1:
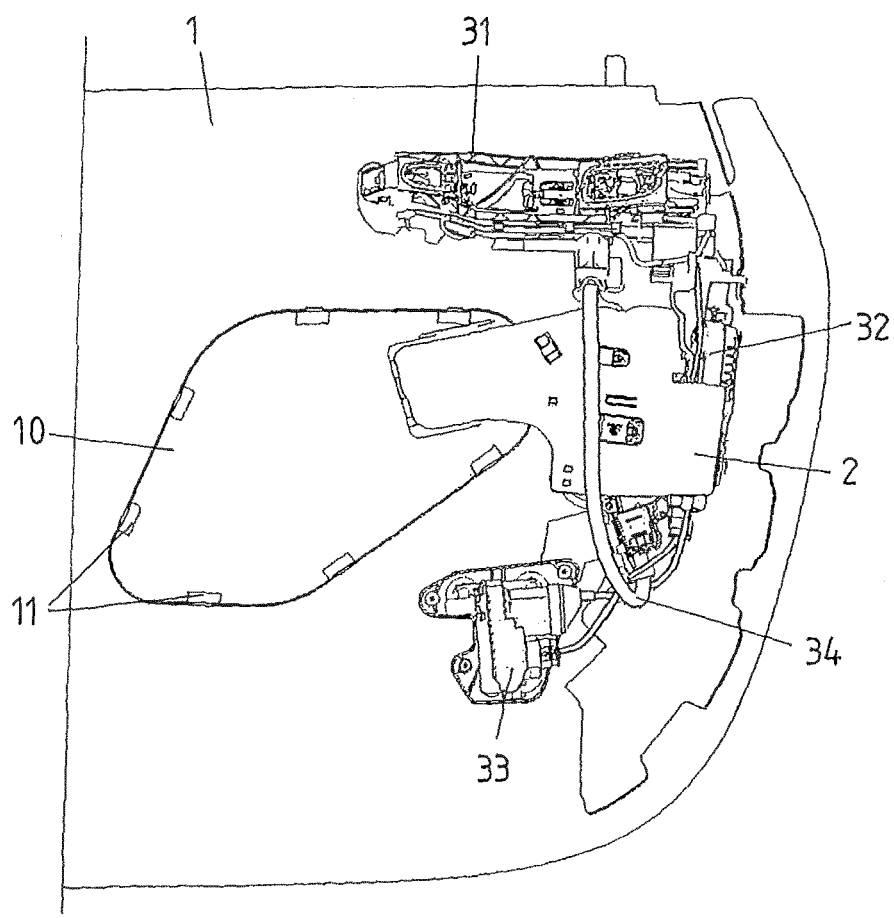
FIG. 1 shows a side view of a door inner panel of a vehicle door with an installation opening and a multifunctional support for connecting several functional elements.

FIG. 1 shows a side view of the door inner panel 1 of a vehicle door, which with a non-illustrated door outer panel forms a door body with a cavity between the door inner panel 1 and the door outer panel, in which several functional elements of the vehicle door are arranged. The door inner panel 1 includes an installation opening 10 through which a part of the functional elements of the vehicle door is introduced into the cavity between door inner panel 1 and door outer panel, before the functional elements partly are connected with the door body.

Among other things, a multifunctional support 2 serving as mounting aid is introduced through the installation opening 10 into the cavity, which carries a bearing bracket 31 for an outside door handle, a door lock 32 and a drive for a door closing aid 33. For transmitting an actuating force from an outside door handle connected with the bearing bracket 31 to the door lock 32, a power transmission means in the form of a Bowden 34 is provided, which connects the outside door handle with the door lock 32.

Since the cavity between the door outer panel and the door inner panel 1 is not protected against moisture due to the gap extending along the door sill for leading through a window pane, the side of the door inner panel 1 facing the cavity is referred to as wet space side and the opposite side of the door inner panel 1 facing the vehicle interior space is referred to as dry space side.

Along the contour of the installation opening 10 several clip receptacles 11 are arranged, which are latchable with clip hooks 43 shown in FIGS. 2 and 3, which are distributed along the edge of an installation cover closing the installation opening 10.

In FIGS. 2 and 3 with a view from the wet space side and in FIGS. 4 and 5 with a view from the dry space side, the installation cover 4 closing the installation opening 10 and a multifunctional support 2 with a covering element 5 are shown in a perspective view before and after covering a lead-through opening 40 of the installation cover 4.

The installation cover 4 includes a first depression 41 extending along its edge, into which a first seal 61 in the form of a foam bead is incorporated. The foam bead applied by means of an injection-molding tool usually is formed cylindrical, but can also have any other geometrical shape. The lead-through opening 40 provided in the installation cover serves for leading through connecting lines 12, 13, for example an actuating Bowden 12 and an electric cable 13 for energizing the door lock 32, the drive for the door closing aid and possibly further functional elements of the vehicle door.

For protecting the dry space side of the door inner panel 1 against the penetration of burglary tools, which for example are put through the sill slot of the vehicle door from the wet space side, and for protecting the dry space side of the door inner panel 1, the lead-through opening 40 in the installation cover 4 is covered by means of the covering element 5 connected with the multifunctional support 2. For the moisture-tight sealing of the connection between the edge of the lead-through opening 40 and the covering element 5, the installation cover 4 includes a second depression 42 extending along the edge of the lead-through opening 40, into which a second seal 62 is injected, preferably likewise in the form of a foam bead.

Figure 7:
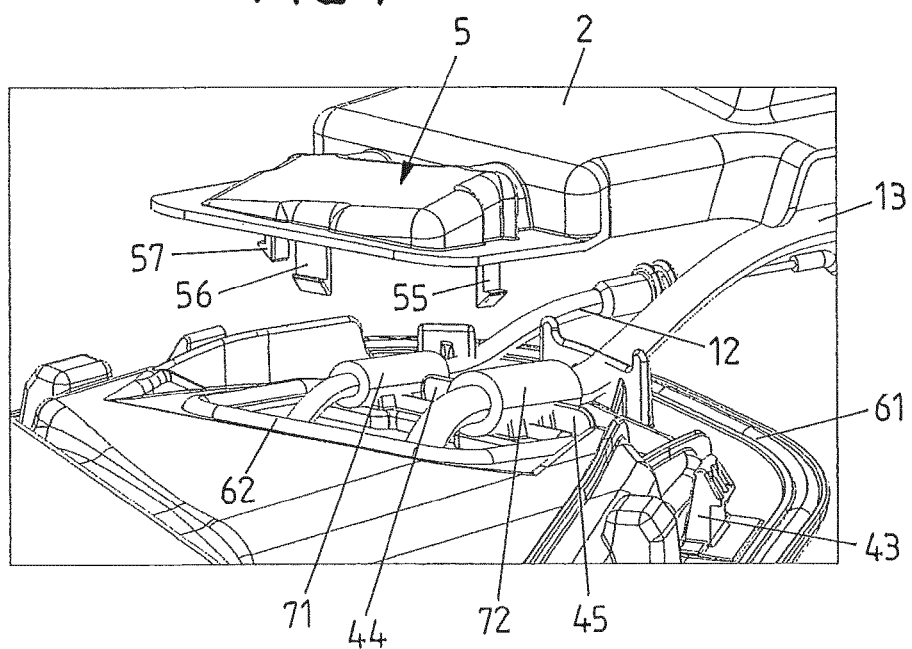
FIG. 7 shows a perspective representation of the lead-through opening of the installation cover with the connecting lines guided through the lead-through opening and of the covering element before covering the lead-through opening.

The connecting lines 12, 13 put through the lead-through opening 40 are sheathed with sealing elements 71, 72 in the edge region of the lead-through opening 40, which preferably consist of cylindrically foamed sleeves and when the covering element 5 is put onto the lead-through opening 40 sealingly rest both against the jackets of the connecting lines 12, 13 and against the inner walls of the semi-cylindrical recesses, 44, 45 also serving for securing the position of the connecting lines 12, 13 according to the enlarged representation of FIG. 7 at the edge of the lead-through opening 40 and according to the enlarged representation of FIG. 1 at the semi-cylindrical recesses 53, 54 at the covering element 5, which in the mounted, covered condition of the lead-through opening 40 by the covering element 5 provide cylindrical lead-through openings which close the lead-through of the connecting lines 12, 13 from the wet space side to the dry space side of the door inner panel 1 in a moisture-tight way.

Figure 6:
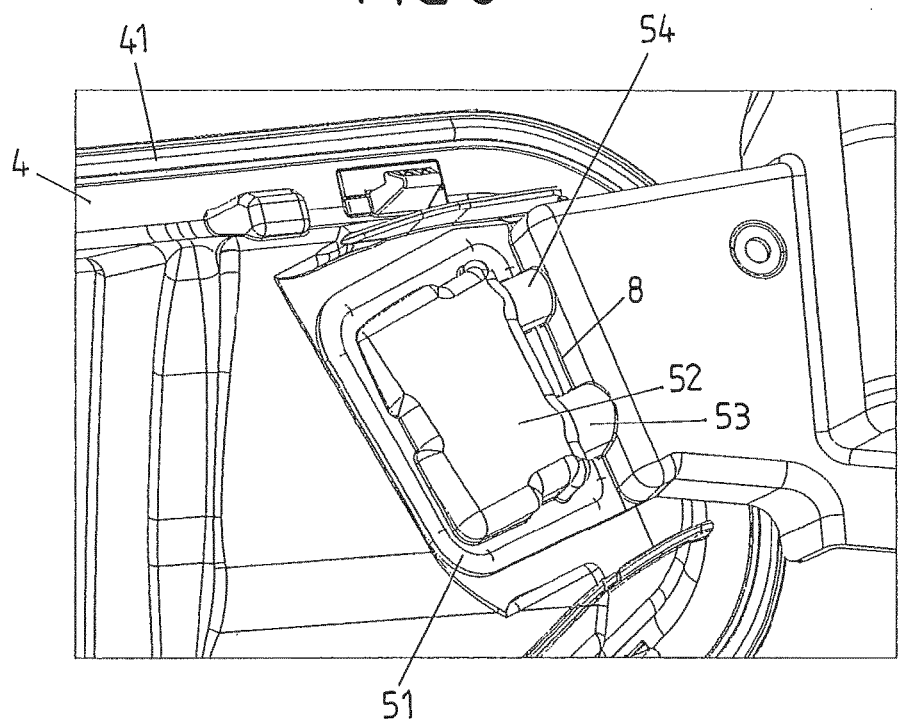
FIG. 6 shows an enlarged perspective representation of the covering element covering the lead-through opening of the installation cover with a part of the multifunctional support.
Figure 8:
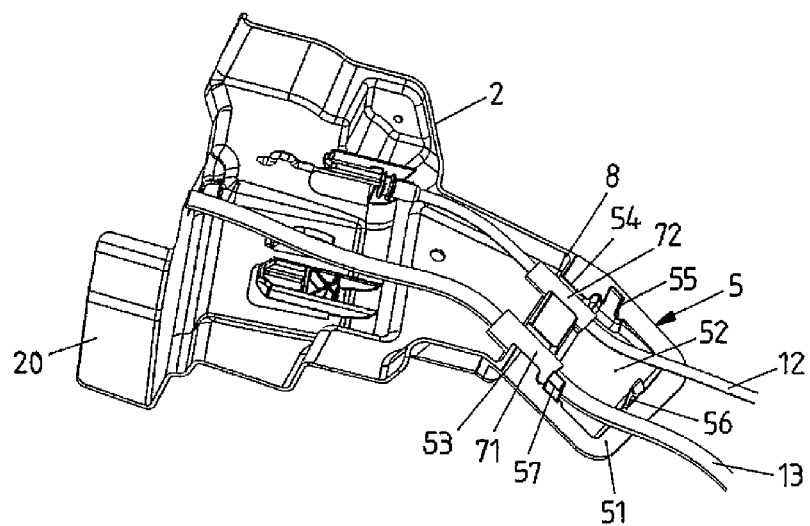
FIG. 8 shows a perspective representation of the multifunctional support with the covering element and the sealing elements arranged in semi-cylindrical receptacles of the multifunctional support for leading through connecting lines
Figure 9:
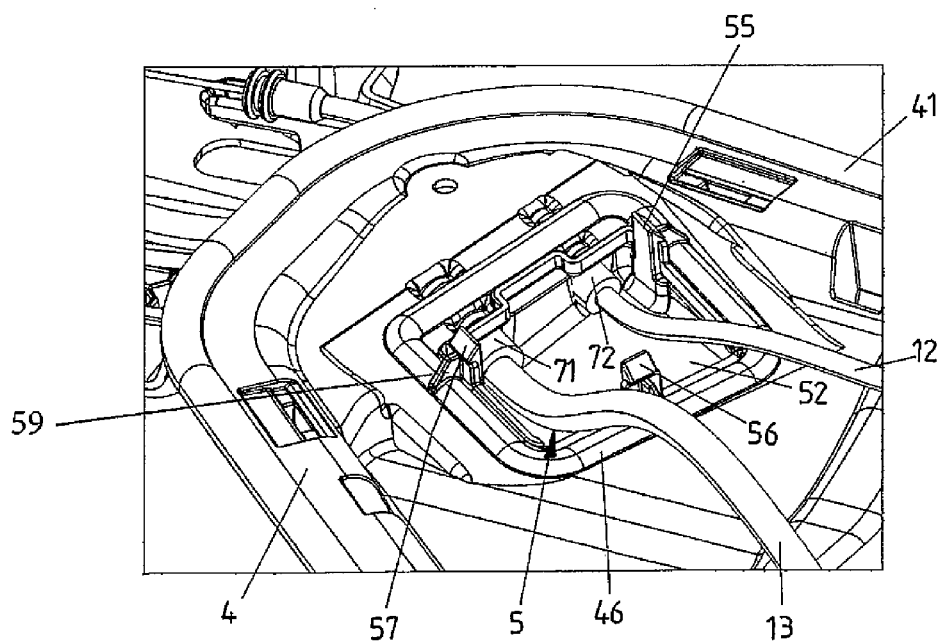
FIG. 9 shows the covering element closing the lead-through opening of the installation cover as seen from the dry space side.

For covering the lead-through opening 40, the covering element 5, which according to FIG. 2 and according to FIG. 6 with an enlarged perspective representation of the covering element 5 includes a covering region 52 and a circumferential edge 51, which in the mounted condition sealingly rests on the second seal 62, is put onto the lead-through opening 40, so that the clip hooks 55, 56, 57 protruding from the inside of the edge 51 of the covering element 5 facing the lead-through opening 40 according to FIGS. 4, 5 and 7 to 9 lock into place with an opening contour 46 via clip receptacles 59 according to FIG. 9, the opening contour 46 extending around the edge of the lead-through opening 40 on the dry space side of the installation cover 4, wherein the edge 51 of the covering element 5 sealingly rests against the second seal 62 of the installation cover 4.

FIG. 6 shows the lead-through opening 40 closed by the covering element 5, and FIG. 7 shows the mounting condition directly before putting the covering element 5 onto the lead-through opening 40 with the clip hooks 55, 56, 57 serving the firm connection of the covering element 5 with the edge of the lead-through opening 40, the sealing elements 71, 72 positionally fixed in the receptacles 44, 45, and the second seal 61 extending around the lead-through opening 40 as well as the actuating Bowden 12 put through the sealing element 71 and the electric cable 13 put through the sealing element 72. When clipping the installation cover 4 and the covering element 5, the covering element 5 is pulled against the installation cover 4 from the wet space side via the clip hooks 55, 56, 57 and clipped.

The interface 8 between the covering element 5 and the multifunctional support 2, which is shown in FIGS. 6 and 8, has a slight flexibility, so that for connecting the covering element 5 with the lead-through opening 40 a corresponding swivel movement around the interface 8 is possible.

FIGS. 2 to 5 and 8 show that the multifunctional support 2 includes an anti-theft protection cover 20, which prevents an external intervention into the functional region of the vehicle door.

FIG. 9 illustrates the lead-through of the connecting lines 12, 13 through the lead through opening 40 and their positional fixation and moisture-tight lead-through through the covering element 5 by means of the semi-cylindrical receptacles 44, 45 of the installation cover 4 and semi-cylindrical receptacles 53, 54 of the covering element 5.

The invention claimed is:

1. A vehicle door comprising:
 a door body including a door inner panel with an installation opening,
 an installation cover closing the installation opening and having a single lead-through opening accommodating a plurality of connecting lines from a wet space side to a dry space side of the vehicle door,
 a multifunctional support for connecting functional elements of the vehicle door to the door body,
 a covering element connected with the multifunctional support substantially covering the lead-through opening in the installation cover, wherein the multifunctional support and the covering element are both mounted to the installation cover on the wet space side,
 a first seal circumferentially extending along an edge of the installation cover,
 a second seal circumferentially extending along an edge of the lead-through opening of the installation cover,
 clip hooks protruding from a side of the covering element facing the dry space side, which are configured to lock into clip receptacles of the installation cover upon closing of the lead-through opening of the installation cover, and
 positionally fixed sealing elements for accommodating the connecting lines, the sealing elements being arranged in a transition region between the covering element and the multifunctional support at an edge region of the lead-through opening, the edge region facing the multifunctional support.

2. The vehicle door according to claim 1, wherein the circumferential first and second seals are arranged in depressions extending along the edge of the installation cover and the lead-through opening of the installation cover, respectively.

3. The vehicle door according to claim 1, wherein the first and second seals are formed as cylindrical foam beads.

4. The vehicle door according to claim 1, wherein the sealing elements are located in semi-cylindrical recesses of at least one of the installation cover and the covering element.

5. The vehicle door according to claim 1, wherein the sealing elements consist of cylindrical foam sleeves.

6. The vehicle door according to claim 1, wherein clip hooks are distributed along the edge of the installation cover, and are configured to be locked into place with clip receptacles of the door inner panel when the installation opening is closed.

7. The vehicle door according to claim 1, wherein the connecting lines consist of an actuating Bowden and an electric cable.

8. The vehicle door according to claim 1, wherein the covering element is connectable with the installation cover or the door inner panel using a securing element.

9. The vehicle door according to claim 1, wherein the clip receptacles of the installation cover include an opening contour extending along the edge of the lead-through opening.

* * * * *